(12) United States Patent
Omoto et al.

(10) Patent No.: US 11,894,171 B2
(45) Date of Patent: Feb. 6, 2024

(54) MAGNETIC POWDER FOR MAGNETIC RECORDING MEDIUM

(71) Applicants: DOWA ELECTRONICS MATERIALS CO., LTD., Tokyo (JP); FUJIFILM Corporation, Tokyo (JP)

(72) Inventors: Hirohisa Omoto, Tokyo (JP); Shuji Kaneda, Tokyo (JP); Satoshi Shiki, Tokyo (JP); Hiroyuki Suzuki, Kanagawa (JP); Toshio Tada, Kanagawa (JP)

(73) Assignees: DOWA ELECTRONICS MATERIALS CO., LTD., Tokyo (JP); FUJIFILM CORPORATION, Tokyo (JP)

( * ) Notice: Subject to any disclaimer, the term of this patent is extended or adjusted under 35 U.S.C. 154(b) by 868 days.

(21) Appl. No.: 16/683,301

(22) Filed: Nov. 14, 2019

(65) Prior Publication Data
US 2020/0161035 A1 May 21, 2020

(30) Foreign Application Priority Data
Nov. 16, 2018 (JP) .................. 2018-215445

(51) Int. Cl.
*H01F 1/34* (2006.01)
*C09C 1/24* (2006.01)
*H01F 1/11* (2006.01)

(52) U.S. Cl.
CPC .............. *H01F 1/348* (2013.01); *C09C 1/24* (2013.01); *H01F 1/11* (2013.01); *C01P 2002/76* (2013.01); *C01P 2004/51* (2013.01); *C01P 2004/61* (2013.01); *C01P 2004/84* (2013.01); *C01P 2006/42* (2013.01)

(58) Field of Classification Search
None
See application file for complete search history.

(56) References Cited

U.S. PATENT DOCUMENTS

| 2010/0065771 A1* | 3/2010 | Fujii ................ H01F 1/113 428/402 |
| 2016/0038383 A1* | 2/2016 | Matsushita ............ A61Q 19/00 428/402 |
| 2016/0217817 A1* | 7/2016 | Masada .................. H01F 1/11 |

FOREIGN PATENT DOCUMENTS

JP  2016-139451  8/2016

* cited by examiner

*Primary Examiner* — Ronak C Patel
(74) *Attorney, Agent, or Firm* — Clark & Brody LP

(57) ABSTRACT

Provided is an Al-containing hexagonal ferrite magnetic powder which produces an excellent durability-improving effect on a magnetic recording medium, wherein uniform pulverization of the magnetic powder can be easily achieved by dispersion treatment in preparation of a magnetic coating material even in cases where the magnetic powder has a small primary particle size or has a composition which is likely to produce hard secondary particles. The magnetic powder for a magnetic recording medium is an Al-containing hexagonal ferrite magnetic powder having an Al/Fe molar ratio of 0.030 to 0.200, and has a particle size distribution in which the volume ratio of particles having a particle size of 30 μm or more as measured by a laser diffraction particle size distribution analyzer with a dispersion pressure of 100 kPa is 5.0% or less, and an activation volume Vact of 1800 nm$^3$ or less.

3 Claims, No Drawings

MAGNETIC POWDER FOR MAGNETIC RECORDING MEDIUM

BACKGROUND OF THE INVENTION

Technical Field

The present invention relates to M-type hexagonal ferrite magnetic powder for a magnetic recording medium, and a production method thereof.

Background Art

As magnetic powders suitable for high-density recording employed in magnetic recording media such as magnetic tapes, hexagonal ferrite magnetic powder is known. For improving the recording densities of magnetic recording media, hexagonal ferrite magnetic powder is required to have a reduced particle size while their original magnetic properties are retained. Moreover, the magnetic recording media are required to have good magnetic properties, and excellent durability during driving.

Patent Document 1 discloses hexagonal ferrite magnetic powder in which a reduced particle size and improved magnetic properties are achieved by adding a rare earth element and Bi, and which also realizes high durability of magnetic recording media by coating of the surface of hexagonal ferrite particles with a hydroxide of aluminum.

RELATED ART DOCUMENT

Patent Document

Patent Document 1: JP-A-2016-139451

SUMMARY OF THE INVENTION

Technical Problem

Magnetic recording media have multilayer structures in which various layers are formed. In the multilayer structures, magnetic layers are formed through a step of applying a coating material containing a magnetic powder (hereinafter referred to as "magnetic coating material") to a base material. In the preparation of the magnetic coating material, an operation of mixing and dispersing the magnetic powder with other coating material components is carried out. The dispersion treatment allows pulverizing of the magnetic powder, to produce a homogeneous coating material. It has been found, however, that, in cases where, for example, the magnetic powder has a primary particle size controlled to a relatively small size, pulverizing into a sufficiently small particle size is difficult during the dispersion treatment for the preparation of the magnetic coating material, so that the resulting film is likely to be incorporated with coarse aggregates of magnetic particles. The coarse aggregates lead to an increased error rate, causing deterioration of reliability of the magnetic recording medium. This problem has not been solved in the technique of Patent Document 1. Moreover, it has become clear that, depending on the composition of the magnetic powder, even in cases where the primary particle size is not very small, hardness of the secondary particles may lead to insufficient pulverizing during the dispersion treatment in the preparation of the magnetic coating material.

An object of the invention is to provide Al-containing hexagonal ferrite magnetic powder which produces an excellent durability-improving effect on a magnetic recording medium, wherein uniform pulverization of the magnetic powder can be easily achieved by dispersion treatment in preparation of a magnetic coating material even in cases where the magnetic powder has a small primary particle size or has a composition which is likely to produce hard secondary particles.

Solution to Problem

The present inventors found that the object can be very effectively achieved by carrying out "finishing pulverizing" in the final stage of the magnetic powder production process, wherein the particle size distribution is preliminarily controlled such that large particles are reduced. When hexagonal ferrite magnetic powder is subjected to measurement by a laser diffraction particle size distribution analyzer with a high dispersion pressure, pulverizing of particles occurs upon the dispersion, resulting in a measurement result showing a particle size distribution in which fine particles are increased compared to the particles before the measurement. In contrast, when the measurement is carried out with a relatively low dispersion pressure, the particle size distribution obtained reflects the presence of large magnetic powder particles that have not been pulverized during the dispersion (particles that are likely to remain in large sizes due to insufficient pulverizing during the dispersion in the actual coating material, which may occur in cases, for example, where the primary particles are small or where the secondary particles are hard). By utilization of this phenomenon, whether or not uniform pulverizing can be easily realized during the dispersion treatment in the preparation of the coating material can be known. More specifically, it was found that, in cases where the amount of large magnetic powder particles is suppressed to a predetermined amount or less in a particle size distribution as measured by a laser diffraction particle size distribution analyzer at 100 kPa (=1 bar), which is a relatively low dispersion pressure, there are less particles that are likely to remain in large sizes due to insufficient pulverizing during the dispersion treatment in the preparation of the magnetic coating material, so that formation of a magnetic layer having good surface properties is possible. The invention was completed based on such a discovery. The present description discloses the following inventions for achievement of the object.

[1] A magnetic powder for a magnetic recording medium, which is Al-containing hexagonal ferrite magnetic powder having an Al/Fe molar ratio of 0.030 to 0.200, and which has a particle size distribution in which the volume ratio of particles having a particle size of 30 μm or more as measured by a laser diffraction particle size distribution analyzer with a dispersion pressure of 100 kPa is 5.0% or less, and an activation volume Vact of 1800 nm$^3$ or less.

[2] The magnetic powder for a magnetic recording medium according to [1], whose particle size distribution further satisfies the following Formula (1):

$$D90_{(100)}/D90_{(500)} < 1.30 \quad (1)$$

wherein $D90_{(100)}$ represents the cumulative 90% particle size (μm) on a volume basis as measured with a dispersion pressure of 100 kPa, and $D90_{(500)}$ represents the cumulative 90% particle size (μm) on a volume basis as measured with a dispersion pressure of 500 kPa.

[3] The magnetic powder for a magnetic recording medium according to [1] or [2], wherein the activation volume Vact is 1100 to 1800 nm$^3$.

[4] A method of producing magnetic powder for a magnetic recording medium, the method comprising the steps of:
adhering a hydroxide of aluminum to the surface of hexagonal ferrite particles;
drying the hexagonal ferrite particles having the hydroxide of aluminum adhered thereto to obtain dry powder; and
subjecting the dry powder to dry pulverizing to control the particle size distribution such that the volume ratio of particles having a particle size of 30 μm or more as measured by a laser diffraction particle size distribution analyzer with a dispersion pressure of 100 kPa is 5.0% or less.

[5] The method of producing magnetic powder for a magnetic recording medium according to [4], wherein the dry pulverizing is carried out with an impact mill having a structure in which powder is pulverized in gaps between fixed pins and pins that travel along a specific rotational orbit(s).

Advantageous Effects of Invention

According to the invention, Al-containing hexagonal ferrite magnetic powder which produces an excellent durability-improving effect on a magnetic recording medium, wherein uniform refining of the magnetic powder can be easily achieved by dispersion treatment in preparation of a magnetic coating material even in cases where the magnetic powder has a small primary particle size or has a composition which is likely to produce hard secondary particles, can be provided. By use of this magnetic powder, the problem of incorporation of the film with large aggregates of magnetic particles can be remarkably suppressed, so that reliable magnetic recording media with low error rates can be stably realized.

DESCRIPTION OF EMBODIMENTS

<Hexagonal Ferrite Magnetic Powder>
[Component Composition]

The hexagonal ferrite used in the invention is a hexagonal ferrite of a magnetoplumbite type (M type) which contains $BaO \cdot 6Fe_2O_3$ as a basic structure. Part of the Fe sites may be substituted with one or more of divalent transition metals M2, tetravalent transition metals M4, and pentavalent transition metals M5. Examples of the divalent transition metals M2 include Co and Zn; examples of the tetravalent transition metals M4 include Ti and Sn; and examples of the pentavalent transition metals M5 include Nb and Ta. By the substitution with these transition elements, magnetic properties such as the coercive force Hc can be controlled. The M2/Fe molar ratio is preferably within the range of 0 to 0.060, more preferably within the range of 0 to 0.040. The M4/Fe molar ratio is preferably within the range of 0 to 0.080, more preferably within the range of 0 to 0.060. The M5/Fe molar ratio is preferably within the range of 0 to 0.060, more preferably within the range of 0 to 0.040. The Fe-site valence $X_{Fe}$ defined by the following Equation (2) may be controlled within the range of, for example, 2.995 to 3.050, or may be set within the range of 3.000 to 3.050. The Fe-site valence $X_{Fe}$ is an index indicating the average valence of Fe-site atoms.

$$X_{Fe}=3+2\times(M2/\text{Fe molar ratio})+4\times(M4/\text{Fe molar ratio})+5\times(M5/\text{Fe molar ratio})/[1+(M2/\text{Fe molar ratio})+(M4/\text{Fe molar ratio})+(M5/\text{Fe molar ratio})] \quad (2)$$

The hexagonal ferrite magnetic powder of the invention contains Al. The Al is adhered to the surface of the hexagonal ferrite particles as an oxide of Al or a hydroxide of Al. In particular, a coating layer prepared by washing a hexagonal ferrite powder synthesized by calcination, drying the powder to provide a dry powder, and then coating the surface of the dry powder with a hydroxide of aluminum containing one or more of aluminum hydroxide, bayerite, boehmite, and amorphous aluminum hydroxide gel, is extremely effective for improving durability of the magnetic layer of a magnetic recording medium (such as a magnetic tape). The durability-improving action can be produced by performing the coating with the hydroxide of aluminum such that the Al/Fe molar ratio in the magnetic powder is 0.030 or more. An Al/Fe molar ratio of 0.040 or more is more effective. However, the presence of Al as a non-magnetic component in an excessive amount may lead to deterioration of magnetic properties. Thus, the Al/Fe molar ratio is preferably within the range of 0.200 or less, or may be controlled to 0.150 or less. For the process of coating with the hydroxide of Al, the technique disclosed in Patent Document 1 may be used. The hydroxide of aluminum adhered to the surface of the hexagonal ferrite particles can be identified by XAFS (X-ray absorption fine structure) analysis.

The hexagonal ferrite magnetic powder of the invention may contain Bi. Bi is an element effective for particle size reduction and improvement of magnetic properties. Most part of Bi in the raw material mixture enters into the hexagonal ferrite magnetic powder. For sufficient production of the action of Bi, the amount of Bi added to the raw material mixture is preferably controlled such that the Bi/Fe molar ratio in the magnetic powder is 0.001 to 0.100.

As other components, rare earth elements may be added to the raw material. Rare earth elements contribute to particle size reduction of hexagonal ferrite. When rare earth elements are represented as R, it is effective to include, in the raw material mixture, one or more rare earth elements in an amount which results in an R/Fe molar ratio within the range of 0.001 to 0.010 in analysis of the magnetic powder. Sc and Y are also regarded as rare earth elements in the present description. Nd, Sm, Y, Er, Ho, and/or the like may be preferably used. In particular, Nd, Sm, and/or Y is/are preferred.

[Particle Size Distribution]

As described above, when the measurement is carried out by a laser diffraction particle size distribution analyzer with a relatively low dispersion pressure, the particle size distribution obtained reflects the presence of large magnetic powder particles that have not been pulverized during the dispersion. Large magnetic particles that are present without pulverizing during measurement with a low dispersion pressure tend to cause a problem since such particles are likely to remain as large particles due to insufficient pulverizing during dispersion in the actual coating material, especially, for example, in cases where the primary particles are small or where the secondary particles are hard. As a result of a wide range of studies, it was found that, in cases of a hexagonal ferrite magnetic powder containing the predetermined amount of Al, by use of a magnetic powder whose particle size distribution is controlled such that the volume ratio of particles having a particle size of 30 μm or more as measured by a laser diffraction particle size distribution analyzer with a dispersion pressure of 100 kPa is 5.0% or less, the problem of incorporation of the film with large aggregates of magnetic particles, which causes an increased error rate of the magnetic recording medium, can be remarkably suppressed within the range of activation volume Vact of 1800 $nm^3$ or less. The particle size distribution is controlled such that the volume ratio of particles having a particle size of 30 μm or more is more preferably 3.0% or less, still more preferably less than 1.0%, as measured by a laser diffraction particle size distribution analyzer with a dispersion pressure of 100 kPa. Further, the particle size distribution is controlled such that the volume ratio of particles having a particle size of 21 μm or more is more preferably 5.0% or less, still more preferably 3.0% or less, as measured by a laser diffraction particle size distribution analyzer with a dispersion pressure of 100 kPa. The particle size distribution is controlled such that the volume ratio of particles having a particle size of 10 μm or more is more preferably 30% or less, still more preferably 20% or less, still more preferably 15% or less, as measured by a laser diffraction particle size distribution analyzer with a dispersion pressure of 100 kPa.

In cases of a magnetic powder containing large-sized particles, a large difference in the particle size distribution is found when two kinds of particle size distributions are measured with different dispersion pressures using a laser diffraction particle size distribution analyzer. More specifically, in cases where the measurement is carried out with a high dispersion pressure, the ratio of small-diameter particles generated by pulverizing is high. Therefore, for example, the volume based cumulative 90% particle size shifts toward the small-diameter side to a greater extent. According to a study by the inventors, the particle size distribution more preferably satisfies the following Formula (1).

$$D90_{(100)}/D90_{(500)} < 1.30 \quad (1)$$

In this formula, $D90_{(100)}$ represents the volume based cumulative 90% particle size (μm) as measured with a dispersion pressure of 100 kPa, and $D90_{(500)}$ represents the volume based cumulative 90% particle size (μm) as measured with a dispersion pressure of 500 kPa.

More preferably, while the Formula (1) is satisfied, $D90_{(100)}$ is 20.0 μm or less, still more preferably 16.0 μm or less.

[Activation Volume Vact]

The hexagonal ferrite magnetic powder in the invention has an activation volume Vact of 1800 nm³ or less as calculated by measurement of magnetic properties. In cases where a magnetic powder is used for a magnetic recording medium, as the degree of filling of the magnetic powder increases, improvement of SNR (noise reduction) can be more effectively achieved. Therefore, application of a magnetic powder having a small Vact is advantageous. However, according to a study by the inventors, it was found that, within the range of Vact of 1800 nm³ or less, sufficient pulverization of the crude particle component is difficult for a conventional pulverizing method, and incorporation of the film with large aggregates of magnetic particles therefore occurs to increase the error rate of the magnetic recording medium, which is problematic. In view of this, the invention attempts to solve the problem in hexagonal ferrite magnetic powders within the Vact range for which such a problem of the remaining large particle component has been unsolved. However, for the extreme reduction of Vact, the primary particle size of the powder needs to be extremely small, and this is disadvantageous in manufacturing. Further, since such a magnetic powder having small primary particles tends to form secondary particles in which individual primary particles gather tightly, it is often disadvantageous for refining during the dispersion treatment in preparation of a coating material. In cases where a priority is to be given to avoidance of such disadvantageous factors, it is effective to control the activation volume Vact within the range of, for example, 1100 nm³ or more.

In cases where hexagonal ferrite is synthesized by a method in which an amorphous body in the raw material mixture is crystallized, the activation volume Vact of the resulting hexagonal ferrite powder can be controlled by combination of "component composition of amorphous body" and "crystallization conditions (especially heating temperature)".

[Powder Magnetic Properties]

The magnetic powder in the invention preferably has a coercive force Hc of 143 to 287 kA/m (about 1800 to 3600 Oe). Further, the saturation magnetization as may be controlled within the range of 40.0 to 50.0 A·m²/kg, and the squareness ratio SQ may be controlled within the range of 0.48 to 0.56.

[BET Specific Surface Area]

As described above, noise reduction of the magnetic recording medium can be effectively achieved by particle size reduction of the magnetic powder used. When the specific surface area is used as a size-related factor of the particles, the BET specific surface area according to the BET single-point method is preferably 50 to 130 m²/g.

<Method of Producing Magnetic Powder>

The hexagonal ferrite magnetic powder according to the invention may be prepared by producing hexagonal ferrite particles using a method in which an amorphous body in a raw material mixture is crystallized, and then performing a method in which a hydroxide of aluminum is adhered to the surface of the hexagonal ferrite particles, and the resulting particles are dried, followed by subjecting the resulting dry powder to "finishing pulverizing". More specifically, for example, the powder may be produced through the following steps.

[Raw Material Mixing Step]

Raw material substances containing an element constituting a hexagonal ferrite magnetic powder and an element required for formation of an amorphous body are mixed together to obtain a raw material mixed powder. The hexagonal ferrite magnetic powder according to the invention has a $BaO \cdot 6Fe_2O_3$-type basic structure. When necessary, part of its Fe is substituted with one or more of divalent, tetravalent, and pentavalent transition metals, and, when necessary, Bi and rare earth elements may be contained. Among the elements, the sources of metallic elements are usually oxides and hydroxides of these elements. As the sources of Ba and B, $BaCO_3$ and $H_3BO_3$, respectively, are preferably used. In cases where Al is mixed in the raw material mixing step, the source of the Al may be, for example, $Al(OH)_3$. The raw material substances are mixed by stirring with a mixer to provide a raw material mixture. It is preferred to perform shear mixing using a mixer having a stirring blade, such as a Henschel mixer.

[Granulation Step]

Taking into account ease of handling and the like in the subsequent steps, the raw material mixture obtained is commonly prepared into a spherical granulated product having a predetermined particle size. The granulated product can be obtained by, for example, using a pan granulator to perform molding into a spherical shape while adding water and, when necessary, a binder component, to provide a granular matter having a diameter of about 1 to 50 mm, and then drying the granular matter by heating to about 200 to 300° C.

[Amorphization Step]

The dried raw material mixture (the granulated product) is melted by heating to a high temperature, to provide a melt at 1350 to 1450° C. The melt is rapidly cooled to provide an amorphous body. Examples of the method of rapid cooling include the twin-roll method, the gas atomization method, the water atomization method, and the centrifugal atomization method. According to a study by the inventors, it was found that hexagonal ferrite crystals with a reduced particle size having an activation volume Vact within the range can be more effectively produced by preliminarily obtaining an amorphous body by the gas atomization method. The particle size may be controlled after pulverizing of the resulting amorphous body with a ball mill or the like, when necessary.

[Crystallization Step]

By retaining the amorphous body under heat within the temperature range of 580 to 720° C., hexagonal ferrite crystals are precipitated. The retention time may be usually 60 to 240 minutes. The powder obtained by this heat treatment for crystallization contains not only hexagonal ferrite crystals, but also substances produced by crystallization of residual components (mainly barium borate crystals) contained in the amorphous body.

[Acid Washing Step]

Subsequently, for extracting hexagonal ferrite particles from the powder obtained by the crystallization step, the residual substances mainly containing barium borate are dissolved and removed with an acid. This treatment is herein referred to as "acid washing". As an acid washing liquid, an aqueous acetic acid solution with a concentration of 2 to 20% by mass is preferred. The powder obtained in the crystallization step is immersed in the acid washing liquid, and kept at the boiling point or a lower temperature. Stirring of the liquid is effective. The pH of the liquid is preferably 5.0 or less. After completion of the dissolution of the residual components, solid-liquid separation is carried out for extraction of a hexagonal ferrite powder.

Since the hexagonal ferrite powder extracted by the solid-liquid separation has the acid washing liquid adhered thereto, the acid washing liquid is removed by washing. This treatment is herein referred to as "water washing". As an initial stage of the water washing, when necessary, neutralization treatment with an aqueous alkaline solution such as aqueous ammonia, an aqueous sodium hydroxide solution, or an aqueous potassium hydroxide solution may be carried out. For example, in cases of sodium hydroxide, the concentration of the aqueous alkaline solution may be adjusted within the range of 0.01 to 1.5 mol/L.

[Pulverizing Step Before Coating]

The thus obtained hexagonal ferrite is preferably subjected to pulverizing treatment for refining. To the pulverizing treatment in this stage, a common wet mill may be applied. More specifically, in a stage before the coating treatment with the hydroxide of aluminum, sufficient refining is preferably carried out such that 90% or more of the total particles fall within the range of particle size of 0.1 to 100 μm in the particle size distribution on a volume basis as measured by a laser diffraction particle size distribution analyzer.

[Step of Coating with Hydroxide of Aluminum]

In the present description, aluminum hydroxide, bayerite, boehmite, and amorphous aluminum hydroxide gel are collectively referred to as hydroxide of aluminum.

Hexagonal ferrite particles after wet pulverizing are dispersed in an aqueous solution containing aluminum salt dissolved therein, to provide a slurry. By adding an alkali to this slurry, a production reaction of a hydroxide of aluminum is allowed to occur, to form a layer of the hydroxide of aluminum on the surface of the hexagonal ferrite particles. The temperature of the slurry may be about 25 to 50° C. The pH of the liquid before the reaction (before the addition of the alkali) is preferably 2.0 to 5.0, more preferably within the range of 2.0 to 4.0. In cases where the pH before the reaction is lower than 2.0, part of the hexagonal ferrite particles tend to be dissolved, leading, in some cases, to deterioration of magnetic properties. The pH of the liquid during the reaction is preferably adjusted to 7.0 to 10.0. A pH lower than 7.0 or higher than 10.0 does not allow sufficient production of the hydroxide of aluminum effective for improvement of durability of the magnetic recording medium, and hence leads to difficulty in coating of the surface of the hexagonal ferrite particles therewith. After completion of the reaction, the slurry is preferably stirred within the temperature range for about 5 to 30 minutes. Examples of applicable aluminum salts include aluminum chloride, aluminum nitrate, aluminum sulfate, aluminum phosphate, aluminum citrate, and aluminum acetate. Examples of applicable alkalis include sodium hydroxide, potassium hydroxide, and ammonia. The amount of the aluminum salt used is preferably set such that the amount of Al is 1 to 17 parts by mass in terms of Al(OH)$_3$ with respect to 100 parts by mass of the solid component (hexagonal ferrite particles after wet pulverizing).

The slurry containing the hexagonal ferrite particles whose surface has the hydroxide of aluminum adhered thereto is subjected to solid-liquid separation by a method such as filtration, to collect the solid component. This solid component is thoroughly washed with water. More specifically, the water washing is preferably carefully carried out until the electric conductivity of the post-washing liquid (filtrate) becomes 10 μS/cm or less.

The solid component after completion of the water washing is dried at a temperature of less than 120° C., more preferably 115° C. or less. The drying period may be selected within the range of, for example, 1 to 20 hours. In cases where the drying temperature is high, stable and remarkable improvement of durability of the magnetic recording medium is difficult. Regarding the lower limit of the drying temperature, there is no particular limit, and normal temperature may be employed. For example, the drying temperature may be set within the range of 20° C. or more. By this, a dry powder containing magnetic particles, in which the surface of hexagonal ferrite particles is coated with the hydroxide of aluminum, can be obtained.

[Finishing Pulverizing Treatment Step]

In the present description, the Al-containing hexagonal ferrite dry powder obtained by, for example, the method described above is finally subjected to finishing pulverizing treatment to control the particle size distribution. As described above, in particular, in cases where the magnetic powder has small primary particles or hard secondary particles, sufficient pulverizing does not easily occur during dispersion treatment in preparation of a magnetic coating material, so that the magnetic layer is likely to be incorporated with large-sized particles. The finishing pulverizing treatment is a step for preliminarily refining large particles that cannot be sufficiently crushed during dispersion treatment in preparation of a magnetic coating material, to control the particle size distribution of the magnetic powder such that a homogeneous coating material can be obtained by ordinary dispersion treatment in preparation of a coating material. More specifically, by dry pulverizing, the particle size distribution is controlled such that "the volume ratio of particles having a particle size of 30 μm or more is 5.0% or less, more preferably 3.0% or less, still more preferably less than 1.0%, as measured by a laser diffraction particle size distribution analyzer with a dispersion pressure of 100 kPa".

For the finishing pulverizing treatment, an impact mill having a structure in which powder is pulverized in gaps between fixed pins and pins that travel along a specific rotational orbit(s) can be suitably used. This type of impact mill is also called pin mill. The inventors attempted a variety of pulverizing methods, but, in the past experiments, it had been difficult to industrially stably give Al-containing hexagonal ferrite powder a particle size distribution in which the amount of particles with a particle size of 30 μm or more is as small as described above. Although the mechanism by which an impact mill having such a structure can realize the effective control of the particle size distribution is not necessarily clear at present, it could be as follows. Magnetic powder particles that entered gaps between the pins fixed in a stationary state and the pins that move at high speed receive strong impact force and shear force from these pins, resulting in instantaneous crushing of the particles. The crushed particles then "pass through" the gaps between the pins without receiving the strong impact repeatedly. Thus, since excessive pulverizing is prevented, crushing into a fine powder does not occur, so that a sharp particle size distribution without large variation of the particle size can be obtained, and moreover, deterioration of magnetic properties due to excessive generation of heat can be suppressed. Regarding the conditions for the finishing pulverizing, optimal conditions can be found by performing a preliminary experiment suitable for the magnetic powder to be applied and the mill employed.

EXAMPLES

Example 1

(Production of Hexagonal Ferrite Magnetic Powder)

Boric acid $H_3BO_3$ (industrial grade), barium carbonate $BaCO_3$ (industrial grade), iron oxide $Fe_2O_3$ (industrial grade), cobalt oxide CoO (reagent, 90% or higher), and niobium oxide $Nb_2O_5$ (industrial grade) were weighed to provide a raw material composition shown in Table 1, and the composition was mixed using an FM mixer manufactured by Mitsui Miike Machinery Co., Ltd., to obtain a raw material mixture. The raw material mixture was placed in a pelletizer, and granulated by molding into a spherical shape while water was sprayed thereto. Thereafter, the resulting product was dried at 270° C. for 14 hours to obtain a granulated product having a particle size of 1 to 50 mm.

The granulated product was melted using a platinum crucible in a melting furnace. After increasing the temperature to 1400° C., the product was kept under stirring for 60 minutes to allow complete melting of each raw material substance. Subsequently, the molten product (molten metal) was discharged from a nozzle, and then rapidly cooled by the gas atomization method, to obtain an amorphous body. The resulting amorphous body was retained under heat at a predetermined temperature to allow crystallization, to produce a hexagonal ferrite. The heat-retaining temperature is referred to as "crystallization treatment temperature". The retention time at the crystallization treatment temperature was 60 minutes.

The powder obtained by the heat-retaining contains not only the hexagonal ferrite, but also residual substances mainly including barium borate. The powder is hereinafter referred to as "powder after crystallization". Acid washing for removal of the residual substances was carried out under the following conditions.

Acid Washing Conditions:

The powder after crystallization was immersed in 10% by mass aqueous acetic acid solution warmed to 60° C., and retained for 1 hour with stirring to allow dissolution of the residual substances in the solution, followed by solid-liquid separation by filtration, and then addition of pure water and washing.

Thereafter, pure water was added to the collected solid, and the resulting mixture was stirred, followed by wet pulverizing using a stirred mill.

To the slurry containing the solid component after the wet pulverizing, an aqueous aluminum chloride solution was added. The amount of Al added from the aluminum chloride was set to 3.3 parts by mass in terms of $Al(OH)_3$ with respect to 100 parts by mass of the solid component. The slurry after the addition of the aqueous aluminum chloride solution was stirred at 40° C. for 10 minutes. The slurry had a pH within the range of 3.0 to 4.0. Thereafter, the pH was adjusted to 8.0 to 9.0 by addition of sodium hydroxide, and the mixture was further stirred at 40° C. for 10 minutes to allow formation of a layer of a hydroxide of aluminum as a reaction product, on the surface of particles of the solid component (hexagonal ferrite magnetic particles). Thereafter, solid-liquid separation was carried out by filtration, and pure water was added to the resulting product, followed by water washing until the electric conductivity of the post-washing liquid (filtrate) became 10 μS/cm or less. Thereafter, the product was dried in air at 110° C. for 12 hours. By this, a dry powder of hexagonal ferrite particles whose surface is coated with the hydroxide of aluminum was obtained.

In the finishing pulverizing step, the resulting dry powder was fed to an impact mill (Fine Impact Mill AVIS-150, manufactured by Millsystem Co., Ltd.) at a feed rate of 150 g/min, and pulverizing was carried out at a rotation speed of 9750 rpm with a clearance of 1 mm between the pin tips of the rotor of the impact mill and the base of the stator. The pulverizing conditions were set within appropriate condition ranges determined by a preliminary experiment. The hexagonal ferrite magnetic powder after the finishing pulverizing step was subjected to the following test as a sample powder. Major items of the magnetic powder production conditions in each example are shown in Table 1 or Table 2 (for the present example, Table 1).

(Analysis of Composition of Magnetic Powder)

The composition of the sample powder was analyzed using a high-frequency induction plasma emission spectrometer ICP (720-ES), manufactured by Agilent Technologies. From the quantified value obtained, the molar ratio of each element to Fe was calculated. For an element X (wherein X represents Bi, Al, or the like), the X/Fe molar ratio is calculated according to the following equation.

$$X/\text{Fe molar ratio} = \text{content of } X(\text{mol \%})/\text{content of Fe(mol \%)}$$

The content of Ba was represented as the Ba/(Fe+Co+Nb+Ti) molar ratio calculated according to the following equation.

Ba/(Fe+Co+Nb+Ti) molar ratio=content of Ba (mol %)/(content of Fe (mol %)+content of Co (mol %)+content of Nb (mol %)+content of Ti (mol %))

Since Ti was not added in the present example, 0 (zero) is assigned to the content of Ti in the equation.

(Fe-Site Valence $X_{Fe}$)

The Fe-site valence $X_{Fe}$ was determined according to the Equation (2).

(Measurement of Particle Size Distribution Using Laser Diffraction Particle Size Distribution Analyzer)

The particle size distribution of the sample was measured with two kinds of dispersion pressures, a dispersion pressure of 100 kPa and a dispersion pressure of 500 kPa, using a HELOS & RODOS particle size distribution analyzer (HELOS/BF) manufactured by Sympatec, under the following conditions: dispersion apparatus, RODOS (feed rate, 50%; funnel height, 3 mm; dispersion pressure, 100 kPa or 500 kPa); laser diffraction measurement, HELOS (optical density, 5 to 10%; trigger condition, normal measurement; focal length of lens, 200 mm; density setting, 2.8 g/cm$^3$; shape factor, 1.000; calculation mode, LD).

(Measurement of Powder Magnetic Properties)

The sample powder was packed into a plastic container having a diameter of 6 mm, and the coercive force Hc, the saturation magnetization σs, the squareness ratio SQ, and the coercive force distribution SFD (the SFD value of the powder in the bulk state) were measured using a VSM apparatus (VSM-P7-15) manufactured by Toei Industry Co., Ltd. with an external magnetic field of 795.8 kA/m (10 kOe).

(Measurement of BET Specific Surface Area)

The specific surface area of the sample powder was calculated by the BET single-point method using 4-Sorb US, manufactured by Yuasa Ionics Co., Ltd.

(Calculation of Activation Volume Vact)

Using a pulse magnetic field generator (manufactured by Toei Industry Co., Ltd.) and a vibrating sample magnetometer (manufactured by Toei Industry Co., Ltd.), the hexagonal ferrite magnetic powder was subjected to saturation magnetization, and a magnetic field in the direction opposite to the direction of the saturation magnetization (referred to as reverse magnetic field) was applied for 0.76 ms, followed by measurement of the amount of residual magnetization upon removal of the magnetic field. By changing the value of the opposite magnetic field, the value of the reverse magnetic field that led to a residual magnetization of 0 Am$^2$/kg, Hr (0.76 ms), was determined. The Hr is referred to as residual coercive force. According to the Hr value of the magnetic body, the value of the reverse magnetic field applied may be appropriately set. Subsequently, the same operation was carried out with an application time of 8.4 ms, and the residual coercive force that led to a residual magnetization of 0 Am$^2$/kg, Hr (8.4 ms), was determined. Further, the same operation was carried out with an application time of 17 s, and the residual coercive force that led to a residual magnetization of 0 Am$^2$/kg, Hr (17 s), was determined. Using Hr (0.76 ms), Hr (8.4 ms), and Hr (17 s), H0 and KuV/kT were calculated according to the following Equation (3), and the values were assigned to the following Equation (4) to calculate the activation volume Vact.

$$Hr(t) = H0(1 - [(kT/KuV)\ln(f0t/\ln 2)]^{0.77}) \quad (3)$$

In the equation, k represents the Boltzmann constant; T represents the absolute temperature; Ku represents the magnetocrystalline anisotropy constant; V represents the activation volume; Hr(t) represents the residual coercive force (Oe) at the application time t; H0 represents the residual coercive force (Oe) at 10$^{-9}$ second; f0 represents the spin precession frequency (s$^{-1}$); and t represents the reverse magnetic field retention time (s). Here, the value of f0 is 10$^{-9}$ (s$^{-1}$).

$$Vact(nm^3) = 1.505 \times 10^5 \times KuV/kT/H0 \quad (4)$$

(Calculation of Plate Ratio)

The plate ratio (hereinafter referred to as "Dx ratio") of a hexagonal ferrite magnetic powder is represented by the ratio between Dxa and Dxc (Dxa/Dxc) as defined below. The Dx ratio of the sample powder was determined.

Dxc represents the crystallite diameter (nm) in the c-axis direction of the hexagonal ferrite crystal lattice; Dxa represents the crystallite diameter (nm) in the a-axis direction of this crystal lattice; and x represents the ratio of the circumference of a circle to its diameter. The crystallite diameter is determined according to the Scherrer equation shown in the following Equation (6), from the half bandwidth of the diffraction peak measured by the X-ray diffraction method (XRD) using Co-Kα radiation.

$$\text{Crystallite diameter (nm)} = K\lambda/(\beta \cdot \cos\theta) \quad (6)$$

In the equation, K represents the Scherrer constant, 0.9; λ represents the Co-Kα radiation wavelength (nm); β represents the half bandwidth (radian) of the diffraction peak on the hexagonal (006) plane in measurement of Dxc, or the half bandwidth (radian) of the diffraction peak on the hexagonal (220) plane in measurement of Dxa; and θ represents the Bragg angle (½ of the diffraction angle 2θ) (radian) of the diffraction peak.

(Formulation of Magnetic Coating Material)

Hexagonal ferrite magnetic powder: 100.0 parts by mass
Oleic acid: 2.0 parts by mass
Vinyl chloride copolymer (MR-104, manufactured by Kaneka Corporation): 5.0 parts by mass
Methyl ethyl ketone: 60.0 parts
Cyclohexanone: 40.0 parts (Preparation of Magnetic Coating Material)

The substances according to the magnetic coating material formulation were prepared by processing using a homomixer at a rotation speed of 15,000 rpm for 20 minutes.

(Evaluation of Magnetic Coating Material Properties)

For evaluation of coarse particles of the magnetic coating material, a grind gauge having a groove width of 12.5 mm and a groove length of 140 mm was used. The scale was read at the position where three or more adjacent lines each of which continues for 10 mm or longer appeared in one groove. In cases where the read value was lower than 50 μm, the coating material was rated as "A", while in cases where the read value was 50 μm or higher, the paint was rated as "B". The coating material was judged as acceptable when it was rated as "A".

For each example, the results of the test are shown in Table 1 or Table 2 (for the present example, Table 1).

Example 2

An experiment was carried out under the same conditions as in Example 1 except that boric acid $H_3BO_3$ (industrial grade), aluminum hydroxide $Al(OH)_3$ (industrial grade), barium carbonate $BaCO_3$ (industrial grade), iron oxide $Fe_2O_3$ (industrial grade), bismuth oxide $Bi_2O_3$ (industrial grade), and neodymium oxide $Nd_2O_3$ (industrial grade) were weighed to provide a raw material composition shown in Table 1, that the crystallization treatment temperature was set as shown in Table 1, that, when the aqueous aluminum chloride solution was added to the slurry containing the solid after the wet pulverizing the amount of Al added from the aluminum chloride was set to 2.1 parts by mass in terms of $Al(OH)_3$ with respect to 100 parts by mass of the solid component, and that the rotation speed of the impact mill was set to 11,500 rpm.

Example 3

An experiment was carried out under the same conditions as in Example 1 except that boric acid $H_3BO_3$ (industrial grade), aluminum hydroxide Al(OH)$_3$ (industrial grade), barium carbonate BaCO$_3$ (industrial grade), iron oxide Fe$_2$O$_3$ (industrial grade), cobalt oxide CoO (reagent, 90% or higher), titanium oxide TiO$_2$ (first-grade reagent), bismuth oxide Bi$_2$O$_3$ (industrial grade), and neodymium oxide Nd$_2$O$_3$ (industrial grade) were weighed to provide a raw material composition shown in Table 1, that the crystallization treatment temperature was set as shown in Table 1, and that, when the aqueous aluminum chloride solution was added to the slurry containing the solid after the wet pulverizing, the amount of Al added from the aluminum chloride was set to 1.8 parts by mass in terms of Al(OH)$_3$ with respect to 100 parts by mass of the solid component.

Example 4

An experiment was carried out under the same conditions as in Example 1 except that boric acid H$_3$BO$_3$ (industrial grade), aluminum hydroxide Al(OH)$_3$ (industrial grade), barium carbonate BaCO$_3$ (industrial grade), iron oxide Fe$_2$O$_3$ (industrial grade), cobalt oxide CoO (reagent, 90% or higher), titanium oxide TiO$_2$ (first-grade reagent), bismuth oxide Bi$_2$O$_3$ (industrial grade), and neodymium oxide Nd$_2$O$_3$ (industrial grade) were weighed to provide a raw material composition shown in Table 1, that the crystallization treatment temperature was set as shown in Table 1, that, when the aqueous aluminum chloride solution was added to the slurry containing the solid after the wet pulverizing, the amount of Al added from the aluminum chloride was set to 2.2 parts by mass in terms of Al(OH)$_3$ with respect to 100 parts by mass of the solid component, and that the rotation speed of the impact mill was set to 11,500 rpm.

Comparative Example 1

An experiment was carried out under the same conditions as in Example 1 except that, in the finishing pulverizing step, pulverizing was carried out using a disk mill (Premax type PR-100, manufactured by Chuo Kakoki Shoji) instead of the impact mill.

Comparative Example 2

An experiment was carried out under the same conditions as in Example 2 except that, in the finishing pulverizing step, pulverizing n was carried out using a disk mill (Premax type PR-100, manufactured by Chuo Kakoki Shoji) instead of the impact mill.

Comparative Example 3

An experiment was carried out under the same conditions as in Example 3 except that, in the finishing pulverizing step, pulverizing was carried out using a disk mill (Premax type PR-100, manufactured by Chuo Kakoki Shoji) instead of the impact mill.

Comparative Example 4

An experiment was carried out under the same conditions as in Example 4 except that, in the finishing pulverizing step, pulverizing was carried out using a disk mill (Premax type PR-100, manufactured by Chuo Kakoki Shoji) instead of the impact mill.

As a result of preparation of magnetic recording tapes by a method described in JP-A-2017-16721 using the magnetic powders according to the invention, good performances could be achieved.

TABLE 1

|  |  | Example 1 | Example 2 | Example 3 | Example 4 |
|---|---|---|---|---|---|
| Raw material composition (g) | H$_3$BO$_3$ | 869.4 | 764.0 | 766.3 | 766.3 |
|  | Al$_2$(OH)$_3$ | — | 60.1 | 62.3 | 62.3 |
|  | BaCO$_3$ | 1715.0 | 1563.4 | 1574.6 | 1574.6 |
|  | Fe$_2$O$_3$ | 972.6 | 918.0 | 920.6 | 920.6 |
|  | CoO | 7.3 | — | 12.1 | 12.1 |
|  | Nb$_2$O$_5$ | 35.6 | — | — | — |
|  | TiO$_2$ | — | — | 18.4 | 18.4 |
|  | Bi$_2$O$_3$ | — | 160.7 | 106.8 | 106.8 |
|  | Nd$_2$O$_3$ | — | 133.9 | 138.9 | 138.9 |
| Crystallization treatment temperature (° C.) |  | 667 | 621 | 655 | 623 |
| Acid washing conditions | Temperature (° C.) | 60 | 60 | 60 | 60 |
|  | Treatment time | 1 | 1 | 1 | 1 |
|  | Acetic acid concentration (% by mass) | 10 | 10 | 10 | 10 |
| Finishing pulverizing treatment |  | Impact mill | | | |
| Magnetic powder molar ratio | Ba/(Fe + Co + Nb + Ti) | 0.093 | 0.074 | 0.074 | 0.073 |
|  | Co/Fe | 0.007 | — | 0.012 | 0.013 |
|  | Nb/Fe | 0.022 | — | — | — |
|  | Ti/Fe | — | — | 0.019 | 0.020 |
|  | Bi/Fe | — | 0.049 | 0.032 | 0.034 |
|  | Nb/Fe | — | 0.004 | 0.004 | 0.005 |
|  | Al/Fe | 0.042 | 0.043 | 0.042 | 0.043 |
|  | Fe-site valence $X_{Fe}$ | 3.036 | 3.000 | 3.007 | 3.007 |
| Magnetic powder properties | Hc (kA/m) | 199 | 205 | 212 | 155 |
|  | σs (Am$^2$/kg) | 46 | 40 | 43 | 42 |
|  | SQ | 0.51 | 0.53 | 0.53 | 0.50 |
|  | BET (m$^2$/g) | 84 | 104 | 95 | 110 |
|  | Vact (nm$^3$) | 1700 | 1400 | 1570 | 1380 |
|  | Dx ratio | 2.6 | 3.2 | 3.2 | 3.0 |

TABLE 1-continued

|  |  |  | Example 1 | Example 2 | Example 3 | Example 4 |
|---|---|---|---|---|---|---|
| Magnetic powder particle size distribution | D10(μm) | Dispersion pressure 100 kPa | 1.0 | 0.9 | 0.9 | 1.0 |
|  |  | Dispersion pressure 500 kPa | 0.9 | 0.9 | 0.9 | 0.9 |
|  | D10$_{(100)}$/D10$_{(500)}$ |  | 1.1 | 1.0 | 1.1 | 1.1 |
|  | D50(μm) | Dispersion pressure 100 kPa | 3.8 | 2.6 | 3.0 | 3.2 |
|  |  | Dispersion pressure 500 kPa | 2.9 | 2.4 | 2.6 | 2.8 |
|  | D50$_{(100)}$/D50$_{(500)}$ |  | 1.3 | 1.1 | 1.2 | 1.2 |
|  | D90(μm) | Dispersion pressure 100 kPa | 14.2 | 7.6 | 8.7 | 9.1 |
|  |  | Dispersion pressure 500 kPa | 11.4 | 7.0 | 7.6 | 8.1 |
|  | D90$_{(100)}$/D90$_{(500)}$ |  | 1.2 | 1.1 | 1.1 | 1.1 |
|  | Volume ratio (%) of 30-μm or larger particles | Dispersion pressure 100 kPa | 0.0 | 0.0 | 0.0 | 0.0 |
|  |  | Dispersion pressure 500 kPa | 0.0 | 0.0 | 0.0 | 0.0 |
|  | Volume ratio (%) of 21-μm or larger particles | Dispersion pressure 100 kPa | 0.7 | 0.0 | 0.2 | 0.1 |
|  |  | Dispersion pressure 500 kPa | 0.3 | 0.0 | 0.0 | 0.0 |
|  | Volume ratio (%) of 10-μm or larger particles | Dispersion pressure 100 kPa | 8.9 | 4.6 | 6.7 | 7.5 |
|  |  | Dispersion pressure 500 kPa | 6.8 | 3.5 | 4.8 | 5.1 |
| Evaluation of magnetic coating material properties |  |  | A | A | A | A |

TABLE 2

|  |  | Comparative Example 1 | Comparative Example 2 | Comparative Example 3 | Comparative Example 4 |
|---|---|---|---|---|---|
| Raw material composition (g) | H$_3$BO$_3$ | 869.4 | 764.0 | 766.3 | 766.3 |
|  | Al$_2$(OH)$_3$ | — | 60.1 | 62.3 | 62.3 |
|  | BaCO$_3$ | 1715.0 | 1563.4 | 1574.6 | 1574.6 |
|  | Fe$_2$O$_3$ | 972.6 | 918.0 | 920.6 | 920.6 |
|  | CoO | 7.3 | — | 12.1 | 12.1 |
|  | Nb$_2$O$_5$ | 35.6 | — | — | — |
|  | TiO$_2$ | — | — | 18.4 | 18.4 |
|  | Bi$_2$O$_3$ | — | 160.7 | 106.8 | 106.8 |
|  | Nd$_2$O$_3$ | — | 133.9 | 138.9 | 138.9 |
| Crystallization treatment temperature (° C.) |  | 667 | 621 | 655 | 623 |
| Acid washing conditions | Temperature (° C.) | 60 | 60 | 60 | 60 |
|  | Treatment time | 1 | 1 | 1 | 1 |
|  | Acetic acid concentration (% by mass) | 10 | 10 | 10 | 10 |
| Finishing pulverizing treatment |  | Disk Mill | | | |
| Magnetic powder molar ratio | Ba/(Fe + Co + Nb + Ti) | 0.095 | 0.072 | 0.073 | 0.075 |
|  | Co/Fe | 0.007 | — | 0.012 | 0.03 |
|  | Nb/Fe | 0.022 | — | — | — |
|  | Ti/Fe | — | — | 0.019 | 0.020 |
|  | Bi/Fe | — | 0.049 | 0.039 | 0.035 |
|  | Nb/Fe | — | 0.004 | 0.004 | 0.005 |
|  | Al/Fe | 0.038 | 0.044 | 0.045 | 0.046 |
|  | Fe-site valence $X_{Fe}$ | 3.036 | 3.000 | 3.007 | 3.007 |
| Magnetic powder properties | Hc (kA/m) | 201 | 202 | 213 | 155 |
|  | σs (Am$^2$/kg) | 45 | 41 | 43 | 41 |
|  | SQ | 0.51 | 0.53 | 0.53 | 0.50 |
|  | BET (m$^2$/g) | 80 | 105 | 94 | 108 |
|  | Vact (nm$^3$) | 1700 | 1410 | 1570 | 1380 |
|  | Dx ratio | 2.6 | 3.2 | 3.2 | 3.0 |
| Magnetic powder particle size distribution | D10(μm) | Dispersion pressure 100 kPa | 1.4 | 2.1 | 1.5 | 2.1 |
|  |  | Dispersion pressure 500 kPa | 1.1 | 1.4 | 1.2 | 1.5 |
|  | D10$_{(100)}$/D10$_{(500)}$ |  | 1.3 | 1.5 | 1.3 | 1.4 |
|  | D50(μm) | Dispersion pressure 100 kPa | 8.8 | 31.1 | 12.8 | 21.7 |
|  |  | Dispersion pressure 500 kPa | 5.0 | 13.1 | 6.6 | 12.1 |

TABLE 2-continued

|  |  | Comparative Example 1 | Comparative Example 2 | Comparative Example 3 | Comparative Example 4 |
|---|---|---|---|---|---|
| $D50_{(100)}/D50_{(500)}$ |  | 1.8 | 2.4 | 1.9 | 1.8 |
| D90(μm) | Dispersion pressure 100 kPa | 71.1 | 137.2 | 83.8 | 97.9 |
|  | Dispersion pressure 500 kPa | 50.7 | 96.0 | 60.1 | 69.6 |
| $D90_{(100)}/D90_{(500)}$ |  | 1.4 | 1.4 | 1.4 | 1.4 |
| Volume ratio (%) of 30-μm or larger particles | Dispersion pressure 100 kPa | 25.3 | 50.7 | 32.5 | 41.5 |
|  | Dispersion pressure 500 kPa | 15.7 | 33.3 | 20.6 | 27.7 |
| Volume ratio (%) of 21-μm or larger particles | Dispersion pressure 100 kPa | 31.5 | 57.6 | 39.7 | 50.7 |
|  | Dispersion pressure 500 kPa | 20.2 | 40.4 | 26.5 | 36.2 |
| Volume ratio (%) of 10-μm or larger particles | Dispersion pressure 100 kPa | 47.1 | 70.4 | 54.9 | 67.7 |
|  | Dispersion pressure 500 kPa | 33.8 | 55.3 | 41.4 | 54.4 |
| Evaluation of magnetic coating material properties |  | B | B | B | B |

What is claimed is:

1. Magnetic powder for a magnetic recording medium, which is an Al-containing hexagonal ferrite magnetic powder having an Al/Fe molar ratio of 0.030 to 0.200, and which has a particle size distribution in which the volume ratio of particles having a particle size of 30 μm or more as measured by a laser diffraction particle size distribution analyzer with a dispersion pressure of 100 kPa is 5.0% or less, and an activation volume Vact of 1800 nm³ or less, wherein a BET specific surface area according to the BET single-point method is from 50 to 130 m²/g, wherein $D90_{(500)}$ is 7.0 μm or more and 11.4 μm or less, wherein $D90_{(100)}$ is 7.6 μm or more and 20.0 μm or less, and wherein $D90_{(100)}$ represents the cumulative 90% particle size (μm) on a volume basis as measured with a dispersion pressure of 100 kPa, and $D90_{(500)}$ represents the cumulative 90% particle size (μm) on a volume basis as measured with a dispersion pressure of 500 kPa.

2. The magnetic powder for a magnetic recording medium according to claim 1, whose particle size distribution further satisfies the following Formula (1):

$$D90_{(100)}/D90_{(500)} < 1.30 \qquad (1).$$

3. The magnetic powder for a magnetic recording medium according to claim 1, wherein the activation volume Vact is 1100 to 1800 nm³.

\* \* \* \* \*